Dec. 21, 1965    G. C. GRAHAM    3,224,378
FLUID PRESSURE PISTON SEAL AND VALVE
Filed Jan. 9, 1964    4 Sheets-Sheet 1

INVENTOR.
GEORGE C. GRAHAM
BY
Q. Jordan Kunik
ATTORNEY

Dec. 21, 1965  G. C. GRAHAM  3,224,378
FLUID PRESSURE PISTON SEAL AND VALVE
Filed Jan. 9, 1964  4 Sheets-Sheet 2
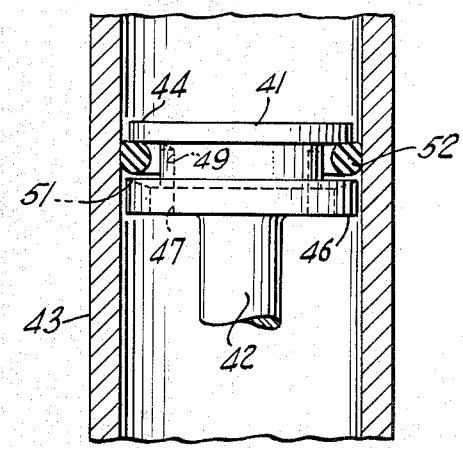
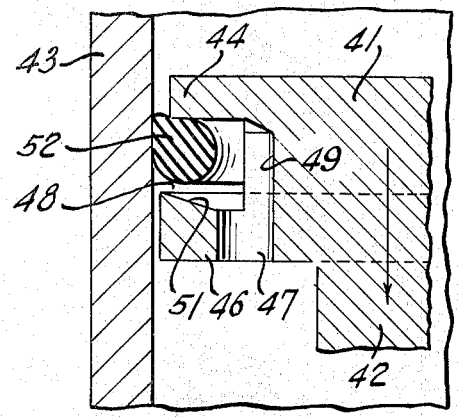 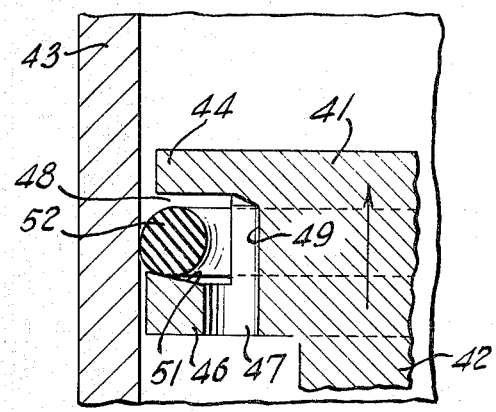
INVENTOR.
GEORGE C. GRAHAM
BY
*L. Jordan Kunik*
ATTORNEY

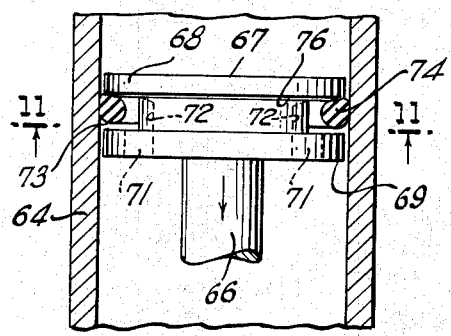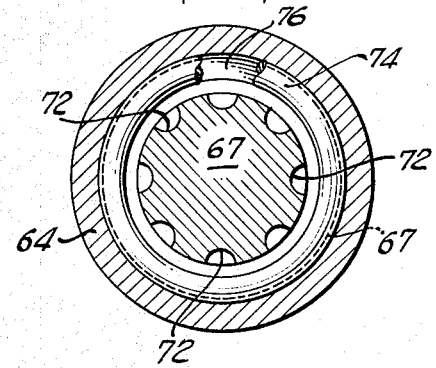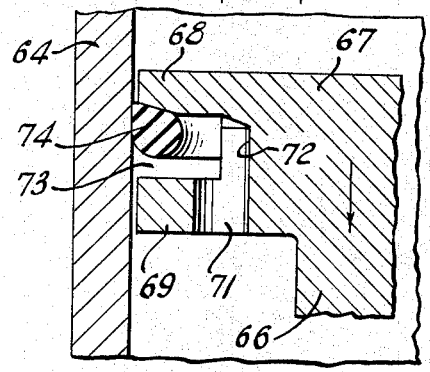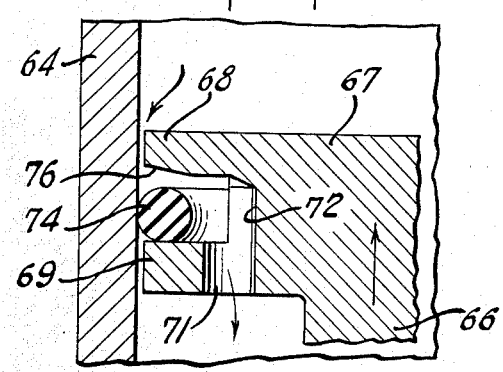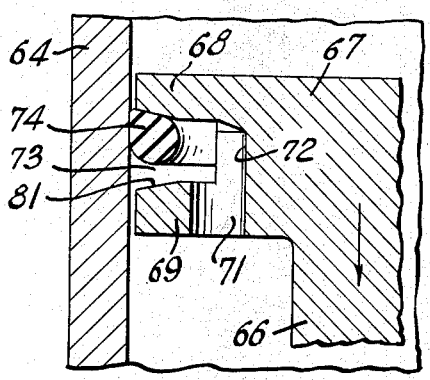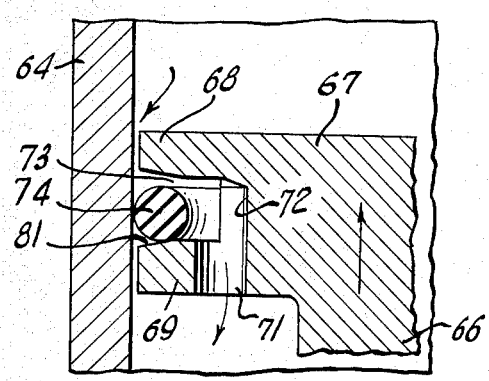

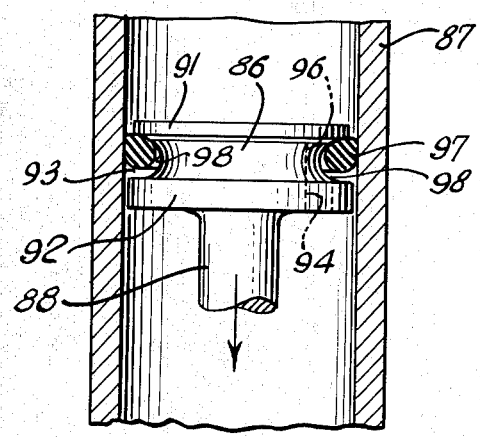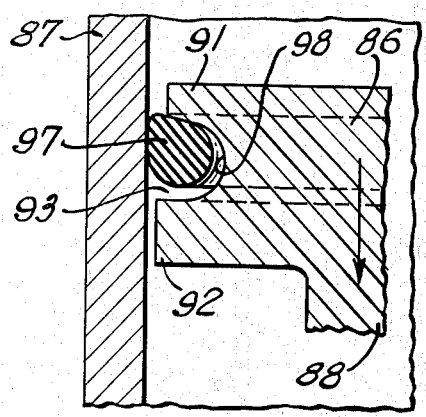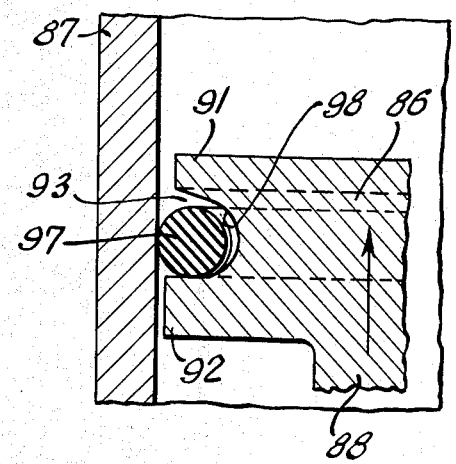

United States Patent Office 3,224,378
Patented Dec. 21, 1965

3,224,378
FLUID PRESSURE PISTON SEAL AND VALVE
George C. Graham, 76 Crest Road, Ridgewood, N.J.
Filed Jan. 9, 1964, Ser. No. 336,699
2 Claims. (Cl. 103—178)

This invention relates to pumping devices, and more particularly to an improved piston seal and valve assembly.

The present invention is concerned with improving the structure and efficiency of a piston seal and valve assembly which performs alternating pressure and return strokes reciprocably within a pump cylinder.

A feature of the invention is the utilization of a loosely fitting resilient sealing ring in the annular channel of a piston combined with one or more flow ports in one portion of the piston which enables the fluid pressure engendered by the movement of said piston rapidly to produce positive pressure upon the sealing ring and to enhance its sealing action between the piston and the cylinder.

In one embodiment of the invention where the piston has a straight sided annular channel bounded by a pair of flanges, the diameter of one of the flanges is different from the other. It is desirable for the diameter of one flange to be only slightly less than the diameter of the cylinder bore in order that the reciprocating piston be axially aligned therewith during its operation. Said flange is provided with fluid ports which allow fluid to enter annular channel behind the sealing ring immediately at the beginning of the pressure stroke, thereby creating both radial and longitudinal pressure against said ring. This pressure against the ring is proportional to the fluid pressure and, consequently, the ring is compressed into its sealing position only to the extent required by the particular fluid pressure being developed. These same fluid ports provide for relatively low resistance to fluid flow on the return stroke of the piston. The diameter of the other flange of the piston is sufficiently less than the diameter of the cylinder bore in order to provide ample space therebetween for fluid flow during the return stroke of the piston.

The cylinder in which the piston operates is divided by the latter into an inlet chamber and an outlet chamber. The inlet chamber is located in that portion of the cylinder on the side of the piston flange that has no apertures, while the outlet or pressure chamber of the cylinder is on that side of the piston on which the flange is apertured. Fluid is drawn into the inlet portion of the cylinder during the pressure stroke of the piston by suction or displacement means. When the piston is performing its return stroke, a suitable valve arrangement on the inlet portion of the cylinder, which is well known in the art, causes the fluid to by-pass the piston into the outlet or pressure chamber of the cylinder. During the pressure stroke of the piston, the sealing ring effectively prevents the leakage of fluid from the pressure or outlet chamber into the inlet chamber.

In another embodiment, where the reciprocating piston is axially aligned within the cylinder bore by well known means, both piston flanges bounding the annular channel may be of the same diameter provided there is sufficient fluid flow between the cylinder bore and the perimeter of that flange which does not have any fluid ports.

In various embodiments of the invention herein, either or both of the side walls of the annular channel bounded by the two flanges may be beveled. In some cases, the bevel of the channel wall is arrayed at an inclined angle to facilitate the outward expansion of the sealing ring, and in others, the channel wall is arrayed at a declined angle to facilitate the retraction of the sealing ring.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIGURE 7 illustrates another embodiment of the invention in a manner similar to FIGURE 1;

FIGURES 8 and 9 are greatly enlarged fragmentary portions of FIGURE 7, analogous to FIGURES 5 and 6, respectively.

FIGURE 10 illustrates a still further embodiment of the invention in a manner similar to FIGURE 1;

FIGURE 11 is a view taken on line 11—11 of FIGURE 10, some parts being broken away;

FIGURES 12 and 13 are greatly enlarged fragmentary views of portions of FIGURE 10, analogous to FIGURES 5 and 6, respectively;

Figure 1:
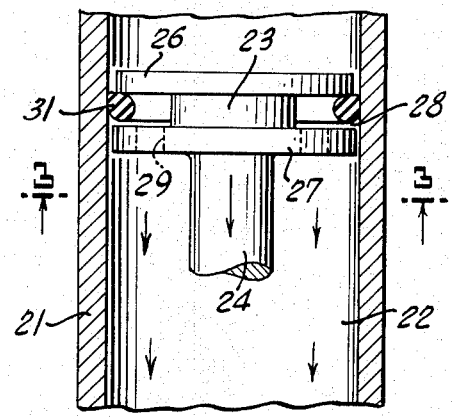
FIGURE 1 illustrates a fragmentary portion of one embodiment of the invention showing a central section view of a cylinder with a piston therein shown in elevation, with the sealing ring shown in section, said elements being shown during a pumping stroke of said pitson.

FIGURES 14 and 15 are greatly enlarged fragmentary views of a further embodiment of the invention, analogous to FIGURES 12 and 13; and FIGURES 16, 17 and 18 are views of a still further embodiment of the invention, analogous in representation to FIGURES 7, 8 and 9.

Referring now to the drawings in detail, one embodiment of the present invention, illustrated in FIGURES 1 through 6, comprises a cylinder 21 of circular cross-section having an interior chamber 22 within which a piston 23 is movable reciprocably.

Piston 23 has an integrally formed shaft 24 which is connected to a suitable power source, not shown, which produces a rectilinear motion of said shaft 24 and of piston 23 within cylinder 21. Piston 23 comprises a pair of integrally formed spaced apart coaxial circular flanges 26 and 27 extending perpendicularly in respect of the axis of shaft 23 and bounding an annular channel 28 therebetween. Flange 27 has at least one or a plurality of circularly arrayed spaced apart apertures 29 permitting fluid flow therethrough between channel 28 and cylinder chamber 22. The diameter of flange 26 is somewhat smaller than the diameter of flange 27, the periphery of the latter being very slightly spaced apart from the wall of chamber 22 whereby fluid flow is permitted to a limited extent therebetween.

Interposed between flange 26 and flange 27 in channel 28 is a seal ring 31 of circular, oval, or other suitable cross-section and made of a suitable flexible, resilient elastic material, such as rubber, or the like. The outside diameter of ring 31 is slightly larger than the inside diameter of cylinder chamber 22. The inside diameter of said ring is somewhat greater than that of the inner wall of channel 28. The cross-section diameter of ring 31 is somewhat less than the distance between the opposing faces of flanges 26 and 27. Ring 31 is loosely arrayed or located in channel 28 whereby it is subject to limited but significant motion in accordance with the flow of fluids through channel 28 and around the periphery of flange 26.

Figure 5:
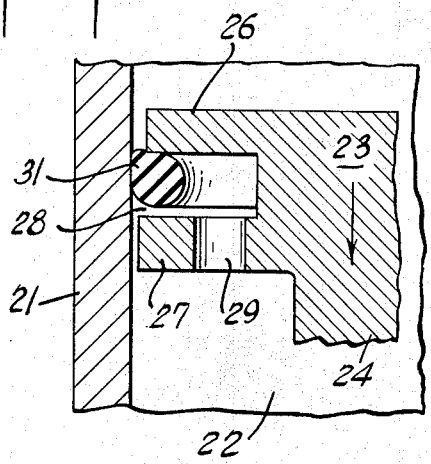
FIGURES 5 and 6 are greatly enlarged fragmentary views of portions of FIGURES 1 and 2, respectively.

By virtue of the particular arrangement of the components of the embodiment of the invention of FIGURES 1 through 6, where the opposing faces of flanges 26 and 27 are substantially parallel, the downward pressure stroke exerted by piston 23 causes fluid in channel 28 to exert outward and upward pressure upon ring 31, a portion of the latter being deformed and wedged into the juncture between the outer corner edge portion of flange 26 and the inner surface of cylinder 21, as shown in FIGURES 1 and 5. By this means an effective seal is established between flange 26 and the walls of cylinder 21 whereby piston 23 is enabled to produce a downward pumping action upon the fluid therebelow in cylinder 21.

At the beginning of the pressure stroke of piston 23, reflex or back pressure due to the intertia of fluid within channel 28 produces a rapid expansion of ring 31 to bring about a fast sealing action between flange 26 and the interior wall of chamber 21.

Upon the downward or pressure stroke of piston 23, sealing ring 31 is in intimate contact with cylinder wall 21 and flange 26, only to the extent required by the actual fluid pressure that is developed within the pressure or outlet chamber of the cylinder. This is in contrast to other devices where excessive contact pressure is produced when the sealing ring is compressed mechanically between the piston and the sealing wall. According to the present invention, considerably less contact pressure is produced between the sealing ring and the cylinder wall, as a consequence of which considerably less friction and friction heat are encountered, wear of the sealing ring is minimized, and a more efficient pumping operation is produced as measured by power consumption.

Figure 2:
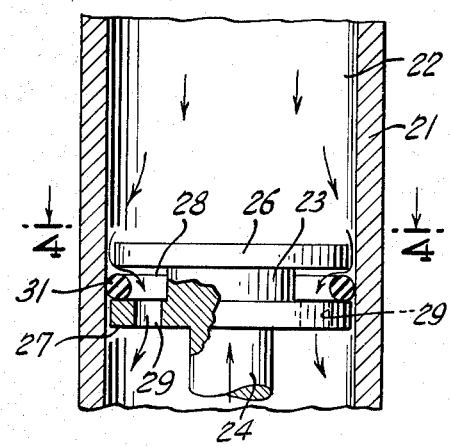
FIGURE 2 is similar to FIGURE 1, said elements being shown during a return stroke of said piston, the latter being partly broken away.
Figure 3:
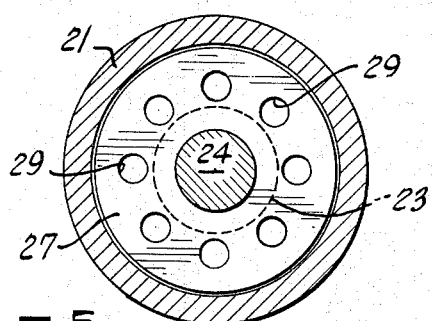
FIGURE 3 is a view taken on line 3—3 of FIGURE 1.
Figure 4:
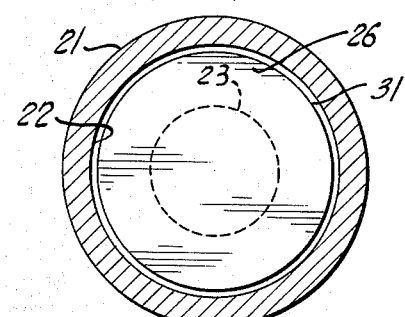
FIGURE 4 is a view taken on line 4—4 of FIGURE 2.
Figure 6:
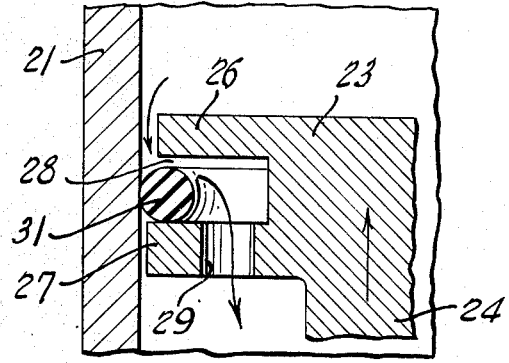

Upon the return stroke of piston 23, as shown in FIGURES 2 and 6, fluid in the upper portion of cylinder 21 flows around the periphery of flange 26 and causes ring 31 to become disengaged from between said flange 26 and the inner wall of said cylinder, whereby fluid passes through channel 28 and through apertures 29 into the lower portion, the cylinder replenishing the latter for the next successive pressure stroke of the piston. Here again by the provision of a loose fitting ring 31, the latter is quickly released from between flange 26 and the cylinder wall to permit the free flow of fluid into channel 28 and through apertures 29. Thus, substantially all resistance, namely, O-ring pressure against the cylinder wall, is eliminated at the beginning of the return stroke of piston 23, thereby greatly increasing its efficiency and reducing wear to a minimum.

Referring now to FIGURES 7, 8 and 9, which disclose another embodiment of the invention, piston 41 powered by shaft 42 is movable longitudinally within cylinder 43. Piston 41 has a pair of integrally formed outwardly extending spaced apart circular flanges 44 and 46, the diameter of the former being somewhat smaller than the diameter of the latter.

Flange 46 has a circular array of spaced apart apertures 47 which communicate with channel 48 formed between flanges 44 and 46. In this embodiment the body of piston 41 has a circular array of recesses 49 each aligned and communicating with corresponding apertures 47 to provide free flow of fluid between channel 48 and the lower portion of cylinder 43.

In this embodiment the inner face of flange 44 is substantially perpendicular to the longitudinal axis of piston 41 and shaft 42 whereas the inner face 51 of flange 46 is beveled at a downwardly extending angle from the peripheral edge of said flange. Positioned within channel 48 is a seal ring 52 of circular cross-section and made of a suitable flexible, resilient, elastic material such as rubber or the like. The outside diameter of ring 52 is slightly larger than the inside diameter of cylinder 43. The cross-section diameter of ring 52 is somewhat less than the distance between the opposing faces of flanges 44 and 46, said ring being loosely arrayed within channel 48.

While the action of the downward pressure stroke of piston 41, as shown on FIGURES 7 and 8, produces a sealing action by ring 52 in channel 48 comparable to the action of ring 31 of FIGURES 1 and 5, there is a somewhat different action in the upward return stroke as illustrated in FIGURE 9. During that upward stroke, negatively beveled surface 51 of flange 46 impinging upon ring 52 causes the latter to become eased away or retracted from the inner wall of cylinder 43 to the extent that friction between said ring and said wall is considerably reduced or substantially eliminated. The reduction or elimination of this friction is an extremely important factor in a great number of pumping contents operations where only low power motive force for operating a pump is desirable or permissible.

Referring now to FIGURES 10, 11, 12 and 13, a still further embodiment of the invention is disclosed wherein cylinder 64 contains a shaft 66 provided with an integral piston 67 having a pair of integrally formed outwardly extending flanges 68 and 69 of substantially equal diameter. Flange 69 has a circular array of apertures 71 which, with respectively aligned recesses 72 in piston 67, establish communication between the bottom portion of said cylinder and annular channel 73 between flanges 68 and 69.

Positioned within channel 73 is a seal ring 74 of circular cross-section and made of a suitable flexible, resilient, elastic material such as rubber or the like. The outside diameter of ring 74 is slightly larger than the inside diameter of cylinder 64. The cross-section diameter of ring 74 is somewhat less than the distance between the opposing faces of flanges 68 and 69, said ring being loosely arrayed within channel 73.

In this embodiment the inner channel face of flange 69 is perpendicular to the inner wall of cylinder 64 and to the axis of shaft 66, while the opposing inner face of flange 68 is provided with a positively beveled annular surface 76 extending to the peripheral edge of said flange. Accordingly, when piston 67 moves downwardly in its pressure stroke as shown in FIGURES 10 and 12, ring 74 is urged outwardly by the inertia or pressure of fluid within channel 73 and by the assistance of beveled annular surface 76, and an annular portion of said ring is wedged partially into the space between the peripheral edge of flange 68 and the innner wall of cylinder 64 thereby effecting a sliding liquid-tight seal therebetween.

The provision of a positive annular bevel inner face on flange 68 is an important factor when it is necessary to augment the outward expansion of ring 74 otherwise produced by the inertia or pressure of fluid in channel 73 in order to produce a quick and sufficient sealing action.

In some pumping operations and applications it may be desirable to provide an improved wiping action upon the cylinder walls particularly during the return stroke of the piston shown in FIGURES 10 through 13. Accordingly, flange 69 may be provided with a beveled surface 81 bounding annular channel 73 as shown in FIGURES 14 and 15 whereby, during the return stroke as shown in FIGURE 15, sealing ring 74 is urged outwardly against the interior wall of cylinder 64 to wipe the surface thereof. This is of particular usefulness when contaminants, suspensions, or dispersions may be present in the pumping fluid.

A further embodiment of the invention is shown in FIGURES 16, 17 and 18, wherein piston 86 is movable reciprocably within cylinder 87 by means of rod 88. Piston 86 has a pair of spaced-apart flanges 91 and 92 defining between them an annular channel 93. In some embodiments, flange 91 may have a smaller diameter than flange 92. Flange 92 has at least one or more ports 94 establishing fluid communication between channel 93 and the lower portion of cylinder 87. Aligned longitudinally with each port 94 is a recess 96 in the inner wall of channel 93 for facilitating fluid flow.

Located within channel 93 is a resilient sealing ring 97 whose outside diameter is slightly greater than the inside diameter of cylinder 87. Ring 97 performs its sealing function in conjunction with flange 91 during the pressure stroke of piston 86 as shown in FIGURES 16 and 17.

During the return stroke of piston 86, as shown in FIGURE 18, ring 97 is retracted from flange 91 to permit fluid to flow past the periphery of said flange into channel 93 and through recess 96 and port 94 into the lower portion of cylinder 87.

At least a portion of or the entire annular surface 98 of channel 93 is curved in a concave or semi-circular contour. The cross-section dimension of ring 97 is selected so that its inner annular curved convex or semi-circular surface is spaced but a small distance apart from the complementary annular curved concave surface 98 of channel 93. This arrangement is of particular advantage when compressible materials such as gas or air are to be pumped by the apparatus. By approximating or complementing the curvature of the channel with the curvature of the sealing ring, a considerable reduction in space between the opposing corresponding curved surfaces can be effected, thereby increasing the pumping efficiency of the apparatus.

Although the drawings illustrate piston shafts or rods 24, 42, 66 and 88 as extending from the side of the respective apertured flanges, it is understood that said rods may otherwise extend from the non-apertured flanges in the opposite direction, depending upon the requirements of design or choice in the operation of various types of pumps.

It is understood that where apertures 29, 47, 71 and 94 are indicated as extending through respective flanges 27, 46, 69 and 92, said apertures may also take the form of spaced apart slots or recesses around the edge of said flanges. Such slots will also perform the same functions of transmitting fluid between the respective channels and the interiors of the cylinders as were performed by the circular apertures described hereinabove.

It is further understood that each of the pumping devices described hereinbefore and hereinafter claimed also operates as a vacuum pump when the inlet portion of the respective cylinder is connected to a corresponding line or space which is to be evacuated.

I claim:

1. A fluid pressure device comprising a cylinder, a piston movable reciprocably within said cylinder, an annular channel in said piston, a resilient sealing ring fitting loosely within said channel, at least one aperture in said piston establishing communication between the interior of said cylinder and the interior of said channel, said ring during the pressure stroke of said piston being urged into a sealing position between said piston and said cylinder at least in part by the pressure exerted radially thereon by the fluid in said channel, and an annular beveled surface on said piston facing said channel against which said ring impinges during the suction stroke of said piston, said surface being arrayed at an angle to urge said ring inwardly during said suction stroke to relieve the pressure between said ring and said cylinder.

2. A fluid pressure device comprising a cylinder, a piston movable reciprocably within said cylinder, a pair of spaced apart annular flanges on said piston, one of said flanges being of lesser diameter than the other flange, the opposing walls of said flanges defining therebetween an annular channel, a resilient ring positioned loosely in said channel, and at least one fluid passage in said piston establishing communication between said channel and the interior of said cylinder, said ring being urged into a position to establish a seal between said flange of said lesser diameter and the cylinder walls during the pressure stroke of said piston, said ring being urged against the opposing flange wall during the suction stroke of said piston whereby fluid flows freely through said channel and through said fluid passage, the channel wall of the larger diameter flange against which said ring is urged during the suction stroke being beveled at an angle to relieve pressure between said ring and the cylinder walls during said suction stroke.

References Cited by the Examiner

UNITED STATES PATENTS

| | | | |
|---|---|---|---|
| 122,825 | 1/1872 | Giffard | 92—182 |
| 2,360,731 | 10/1944 | Smith | 277—177 |
| 2,427,787 | 9/1947 | Hunter | 277—171 |
| 2,689,533 | 9/1954 | Ericson | 103—178 |
| 2,747,954 | 5/1956 | Damm et al. | 277—177 |
| 2,940,674 | 6/1960 | Hanje | 230—190 X |
| 3,028,620 | 4/1962 | Quinn | 277—177 |

FOREIGN PATENTS

| | | |
|---|---|---|
| 1,019,450 | 10/1952 | France. |
| 1,083,881 | 6/1954 | France. |
| 8,149 | 4/1895 | Great Britain. |
| 18,972 | 10/1895 | Great Britain. |
| 615,780 | 1/1949 | Great Britain. |
| 742,113 | 12/1955 | Great Britain. |
| 308,083 | 9/1955 | Switzerland. |

LAURENCE V. EFNER, *Primary Examiner.*